United States Patent
Jacobson et al.

(10) Patent No.: US 11,404,910 B2
(45) Date of Patent: Aug. 2, 2022

(54) MULTI-CELL INDUCTIVE WIRELESS POWER TRANSFER SYSTEM

(71) Applicant: RAYTHEON COMPANY, Waltham, MA (US)

(72) Inventors: Boris S. Jacobson, Westford, MA (US); Sara L. Makowiec, Framingham, MA (US); Mark S. Langelier, Harrisville, RI (US); Michael F. Janik, Portsmouth, RI (US); George E. Anderson, Barrington, RI (US)

(73) Assignee: RAYTHEON COMPANY, Waltham, MA (US)

( * ) Notice: Subject to any disclaimer, the term of this patent is extended or adjusted under 35 U.S.C. 154(b) by 667 days.

(21) Appl. No.: 15/933,893

(22) Filed: Mar. 23, 2018

(65) Prior Publication Data
US 2019/0296582 A1    Sep. 26, 2019

(51) Int. Cl.
| | |
|---|---|
| *H02J 50/12* | (2016.01) |
| *H01F 38/14* | (2006.01) |
| *H01F 27/24* | (2006.01) |
| *H02M 7/5387* | (2007.01) |
| *B60L 53/12* | (2019.01) |
| *H02J 7/02* | (2016.01) |
| *H02M 7/219* | (2006.01) |

(Continued)

(52) U.S. Cl.
CPC .............. *H02J 50/12* (2016.02); *B60L 53/12* (2019.02); *B60L 53/36* (2019.02); *B60L 53/38* (2019.02); *H01F 27/24* (2013.01); *H01F 38/14* (2013.01); *H02J 7/025* (2013.01); *H02J 50/40* (2016.02); *H02M 7/219* (2013.01); *H02M 7/5387* (2013.01); *H02J 7/0027* (2013.01); *H02J 2207/20* (2020.01); *H02M 3/33584* (2013.01)

(58) Field of Classification Search
CPC .......... H02J 50/12; H01F 38/14; H01F 27/24; H02M 7/5387; B60L 53/12
USPC ........................................... 320/108
See application file for complete search history.

(56) References Cited

U.S. PATENT DOCUMENTS

| | | |
|---|---|---|
| 3,866,086 A | 2/1975 | Miyoshi et al. |
| 4,494,100 A | 1/1985 | Stengel et al. |

(Continued)

FOREIGN PATENT DOCUMENTS

| | | | |
|---|---|---|---|
| WO | 2006001557 A1 | 1/2006 | |
| WO | WO2006001557 | * 5/2006 | |
| WO | WO-2009116025 A2 | * 9/2009 | ........... H01F 27/266 |

OTHER PUBLICATIONS

Wu, Oct. 2015, Secondary-Side Phase-Shift-Controlled Dual-Transformer-Based Asymmetrical Dual-Bridge Converter With Wide Volage Gain.*

(Continued)

*Primary Examiner* — Richard V Muralidar
(74) *Attorney, Agent, or Firm* — Cantor Colburn LLP

(57) ABSTRACT

A multi-cell inductive wireless power transfer system includes multiple transmitting elements. Each transmitting element includes one or more transmitting windings and one or more transmitting magnetic cores. The multi-cell inductive wireless power transfer system also includes multiple receiving elements. The transmitting elements are separated from the receiving elements by an air gap. Each receiving element includes one or more receiving windings and one or more receiving magnetic cores.

12 Claims, 10 Drawing Sheets

(51) Int. Cl.
  *B60L 53/38* (2019.01)
  *B60L 53/36* (2019.01)
  *H02J 50/40* (2016.01)
  *H02J 7/00* (2006.01)
  *H02M 3/335* (2006.01)

(56) References Cited

U.S. PATENT DOCUMENTS

| | | | |
|---|---|---|---|
| 4,510,915 | A | 4/1985 | Ishikawa et al. |
| 4,613,843 | A | 9/1986 | Esper et al. |
| 4,748,532 | A | 5/1988 | Commander et al. |
| 4,890,083 | A | 12/1989 | Trenkler et al. |
| 5,039,964 | A | 8/1991 | Ikeda |
| 5,431,987 | A | 7/1995 | Ikeda |
| 5,502,430 | A | 3/1996 | Takahashi et al. |
| 5,579,202 | A | 11/1996 | Tolfsen et al. |
| 5,592,089 | A | 1/1997 | Danby et al. |
| 5,844,451 | A | 12/1998 | Murphy |
| 6,023,161 | A | 2/2000 | Dantsker et al. |
| 6,490,176 | B2 | 12/2002 | Holzer et al. |
| 6,501,364 | B1 | 12/2002 | Hui et al. |
| 7,191,007 | B2 | 3/2007 | Desai et al. |
| 7,378,817 | B2 | 5/2008 | Calhoon et al. |
| 7,471,986 | B2 | 12/2008 | Hatlestada |
| 8,097,983 | B2 | 1/2012 | Karalis et al. |
| 8,102,235 | B2 | 1/2012 | Hui et al. |
| 8,476,788 | B2 | 7/2013 | Karalis et al. |
| 10,103,553 | B2 * | 10/2018 | Park ............ H04B 5/0087 |
| 2013/0250623 | A1 * | 9/2013 | Xu ............ H02M 3/33507 363/17 |
| 2016/0064994 | A1 * | 3/2016 | Ku ............ H02J 7/025 307/104 |

OTHER PUBLICATIONS

Jian-Guang Shi et al., "Design and analysis of an underwater inductive coupling power transfer system for autonomous underwater vehicle docking applications", Journal of Zhejiang University—SCIENCE C, vol. 15, No. 1, 2014, pp. 51-62.

Tianze Kan et al., "Design and Analysis of a Three-Phrase Wireless Chargin System for Lightweight Autonomous Underwater Vehicles", IEEE Transactions on Power Electronics, 2017, pp. 1-11.

Zhiyuan Cheng et al., "Design and Loss Analysis of Loosely Coupled Transformer for an Underwater High-Power Inductive Power Transfer System", IEEE Transactions on Magnetics, vol. 51, No. 7, Jul. 2015, pp. 1-10.

International Search Report and Written Opinion for Application No. PCT/US2019/023519; Application filing date Mar. 22, 2019; dated May 16, 2019 (17 pages).

Virginia Tech CPES Library "High-Frequency Isolation Solution for DC distribution Data Center" <URL:https://cpes.vt.edu/library/viewnugget/558> [retrieved on Jun. 14, 2019] (4 pages).

Wu et al., "Secondary-Side Phase-Shift-Controlled Dual-Transformer-Based Asymmetrical Dual-Bridge Converter with Wide Voltage Gain." IEEE Transactions on Power Electronics, vol. 30, No. 10, Oct. 1, 2015, pp. 5381-5392.

* cited by examiner

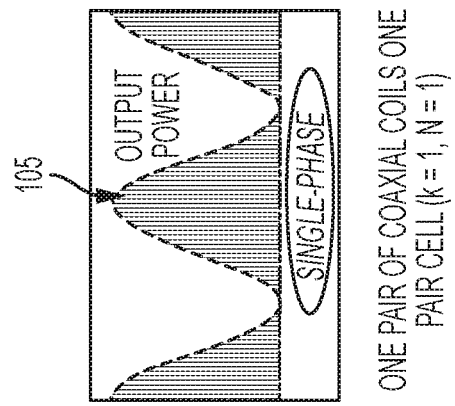
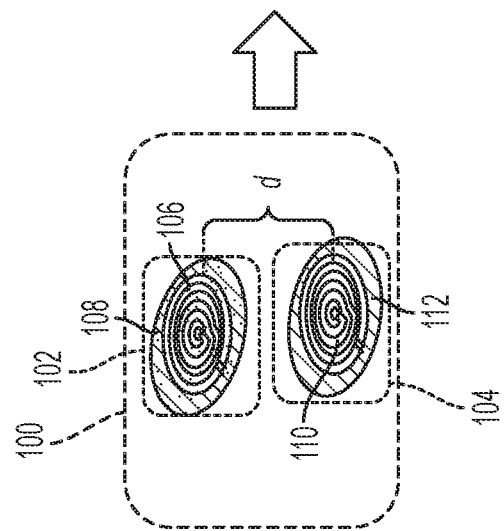
FIG. 1A
FIG. 1B

OUTPUT POWER OF 5-PHASE SYSTEM WITH A LOST PHASE HAS A LARGE LOWER FREQUENCY RIPPLE COMPONENT

TO CORRECT THE PHASE UNBALANCE, THE REMAINING PHASES ARE REASSIGNED TO FORM A 3-PHASE SYSTEM WITH REDUCED LOWER FREQUENCY RIPPLE ical wireless power transfer systems, and more particularly, to wireless power transfer systems.

MULTI-CELL INDUCTIVE WIRELESS POWER TRANSFER SYSTEM

BACKGROUND

The present disclosure relates to power transfer systems, and more particularly, to wireless power transfer systems.

Inductively-coupled power transfer is gaining acceptance in military and commercial applications. Evolving undersea systems, for example, serve a variety of military and commercial applications including data communication networks, object sensing and detection systems, and vehicle hub systems. To achieve these wide-ranges of applications, conventional inductively-coupled power transfer devices aim to employ an uncomplicated and robust power interface to facilitate practical energy transfer.

SUMMARY

According to a non-limiting embodiment, a multi-cell inductive wireless power transfer system includes multiple transmitting elements. Each transmitting element includes one or more transmitting windings and one or more transmitting magnetic cores. The multi-cell inductive wireless power transfer system also includes multiple receiving elements. The transmitting elements are separated from the receiving elements by an air gap. Each receiving element includes one or more receiving windings and one or more receiving magnetic cores.

According to another non-limiting embodiment, a power converter system comprises a multi-cell inductive wireless power transfer system including a plurality of transmitting elements, a plurality of receiving elements, a transmitting power converting circuit, and a receiving power converting circuit. Each transmitting element includes at least one transmitting winding and at least one transmitting magnetic core. Each receiving element includes at least one receiving winding and at least one receiving magnetic core. The transmitting power converting circuit is configured to convert an input power signal into a transmitting power signal to drive the plurality of transmitting elements. The receiving power converting circuit is configured to convert a transferred power signal received at the plurality of receiving elements into an output power signal to drive an electrical load.

According to yet another non-limiting embodiment, a power charging system comprises a charging station capable of recharging a vehicle that moves independent of the charging station. The charging station includes a plurality of transmitting elements. Each transmitting element includes at least one transmitting winding and at least one transmitting magnetic core. The vehicle includes a plurality of receiving elements. Each receiving element includes at least one receiving winding and at least one receiving magnetic core.

According to still another non-limiting embodiment, a method is provided to control a power charging system. The method comprises generating a magnetic field via at least one transmitting element among a plurality of transmitting elements installed in a charging station. The magnetic field is generated in response to energizing at least one transmitting winding arranged adjacent to at least one transmitting magnetic core included in the at least one transmitting element. The method further comprises positioning a vehicle including at least one receiving element among a plurality of receiving elements in proximity of the magnetic field. The magnetic field energizes at least one receiving winding arranged adjacent to at least one receiving magnetic core included in the at least one receiving element. The method further comprises generating an output power in response to energizing the least one receiving element, and charging a battery of the vehicle based on the output power.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts:

FIGS. 1A and 1B illustrate a single-cell, single-coil inductive wireless power transfer system;

DETAILED DESCRIPTION

Figure 2:
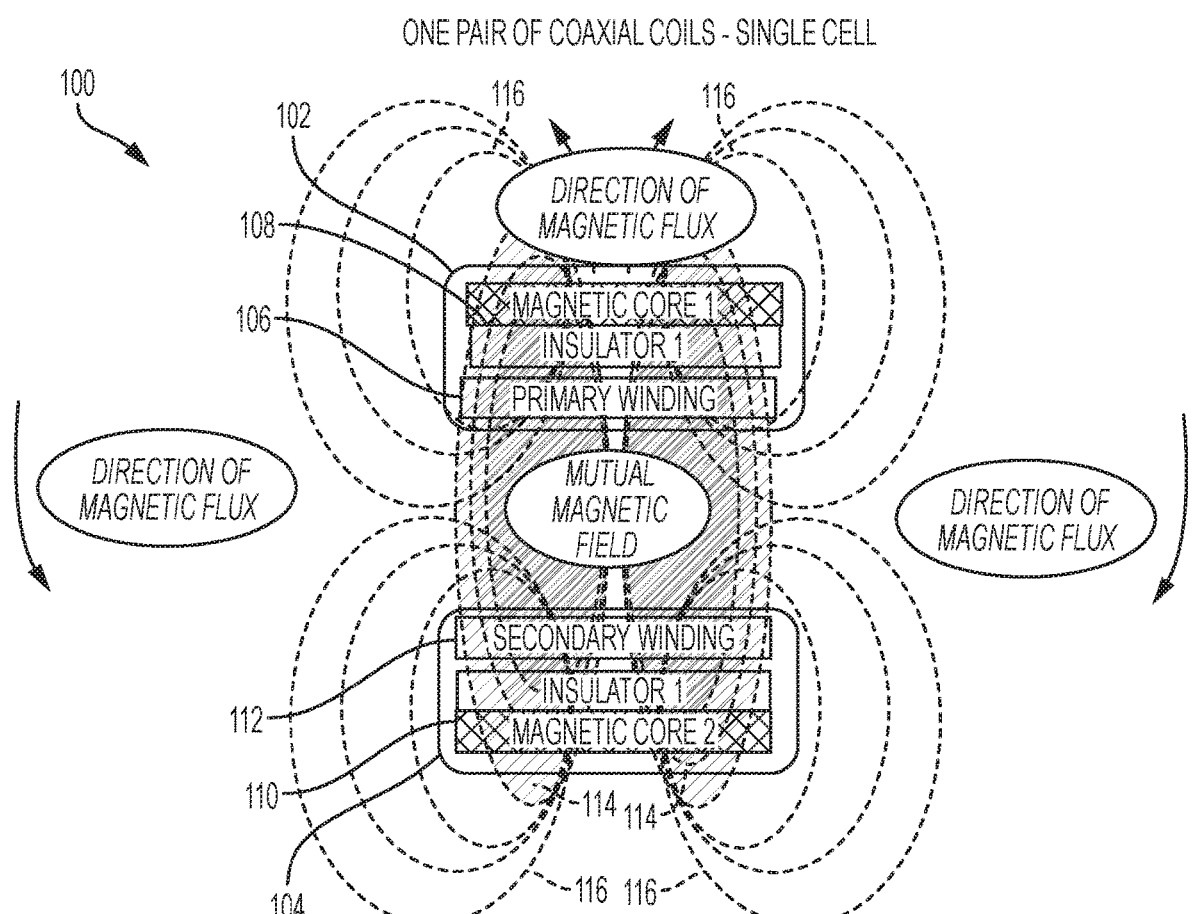
FIG. 2 illustrates the magnetic coupling and stray magnetic fields occurring in a single-cell, single-coil inductive wireless power transfer system.

Single-cell power transfer systems 100 (see FIGS. 1A-1B) have been developed to facilitate inductively-coupled energy transfer between a single transmitting coil and a single receiving coil. These single-cell power transfer systems 100 include a single transmitting (XMT) element 102 and a single receiving (RCV) element 104, which together output a single-phase power signal 10. The transmitting element 102 contains a transmitting coil 106 and a transmitting magnetic core 108. The receiving element 104 contains a receiving coil 110 and a receiving magnetic core 112. The transmitting element 102 and the receiving element 104 are separated from each other by a distance (d), but can inductively transfer energy between one another. The use of single-cells driven by a single-phase signal, produces a strongly fluctuating input and output power along with excessive stray magnetic fields 116 contributing to inefficient energy transfer (see FIG. 2).

Various non-limiting embodiments described herein provide a multi-cell inductive wireless power transfer system capable of improving the efficiency of power transfer between the transmitting elements and the receiving elements, while reducing the amount of stray magnetic fields. In this manner, an inductive wireless power transfer system having reduced volume of energy transfer components is provided compared to single-cell power transfer systems.

Figure 3A:
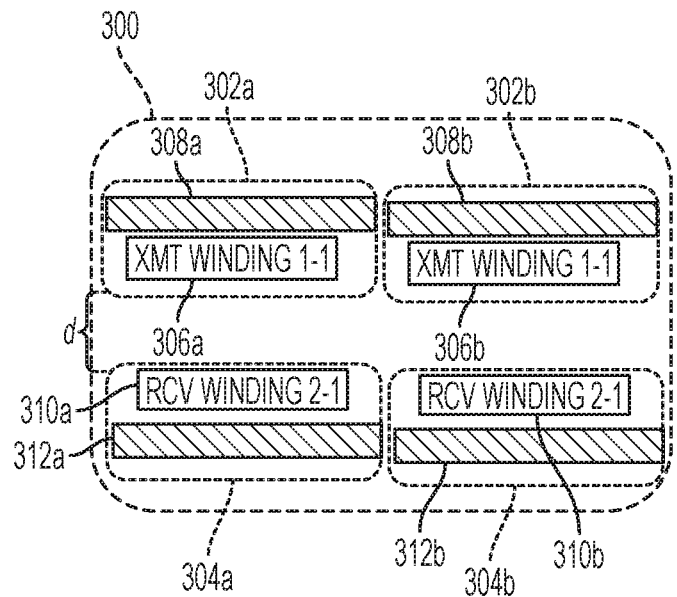
FIGS. 3A and 3B illustrate a multi-cell, single-coil inductive wireless power transfer system according to a non-limiting embodiment.
Figure 3B:
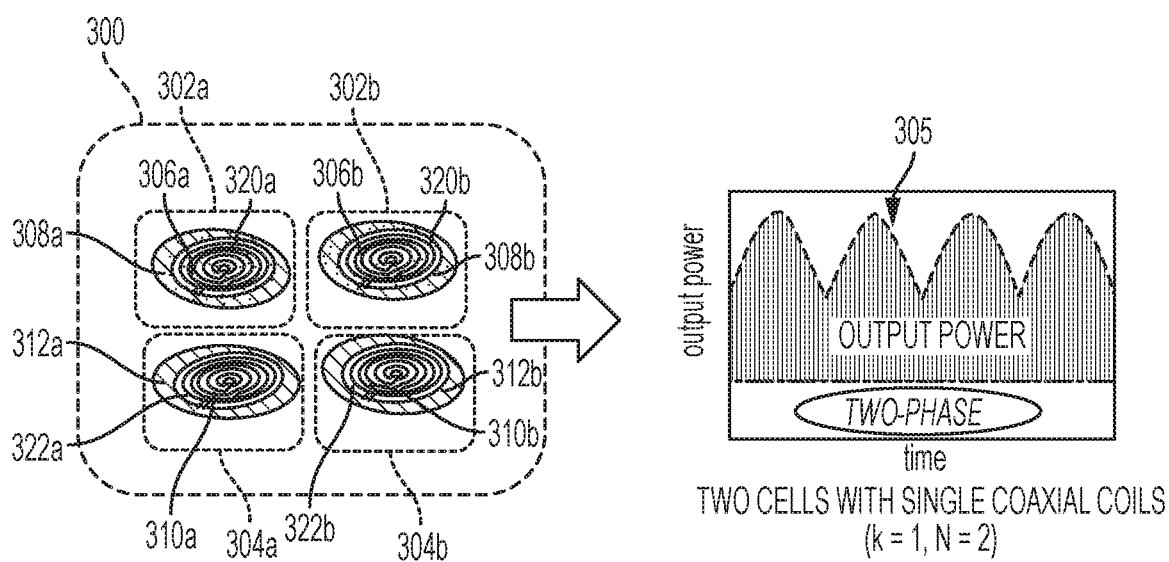

Turning now to FIGS. 3A and 3B, a multi-cell, single-coil inductive wireless power transfer system 300 is illustrated according to a non-limiting embodiment. The multi-cell, single-coil inductive wireless power transfer system 300 includes a first transmitting element 302a, a second transmitting element 302b, a first receiving element 304a and a second receiving element 304b. The first and second transmitting elements 302a and 302b are separated from the first and second receiving elements 304a and 304b by an air gap, which defines a separation distance (d). For example, the distance (d) between the transmitting elements 302a and 302b with diameter of about 60 to 80 mm and the receiving elements 304a and 304b with diameter of about 40 to 60 mm, respectively can range, for example, from about 10 millimeters (mm) to about 20 mm. By providing multiple transmission elements 302a and 302b and multiple receiving elements 304a and 304b, the multi-cell inductive wireless power transfer system 300 can output a multi-phase (e.g., two-phase) power signal 305, as opposed to a single-phase output power signal (see FIG. 2).

The first transmitting element 302a includes a first transmitting winding 306a and a first transmitting magnetic core 308a. The second transmitting element 302b includes a second transmitting winding 306b and a second transmitting magnetic core 308b. In at least one embodiment, the first transmitting winding 306a is vertically arranged (e.g., stacked) with respect to the first transmitting magnetic core 308a, and the first transmitting winding 306a is formed on a first insulating layer 320a (see FIG. 3B). An air gap can separate the first transmitting winding 306a from the first transmitting magnetic core 308a by a distance (d). Similarly, the second transmitting winding 306b is vertically arranged (e.g., stacked) with respect to the second magnetic transmitting core 308b. The second transmitting winding 306b is formed on a second insulating layer 320b (see FIG. 3B), and an air gap can separate the second transmitting winding 306b from the second transmitting magnetic core 308b by a distance (d).

The first receiving element 304a includes a first receiving winding 310a and a first receiving magnetic core 312a. The second receiving element 304b includes a second receiving winding 310b and a second receiving magnetic core 312b. In at least one embodiment, the first receiving winding 310a is vertically arranged (e.g., stacked) with respect to the first receiving magnetic core 312a. The first receiving winding 310a is formed on an insulating layer 322a (see FIG. 3B), and an air gap can separate the first receiving winding 310a from the first receiving magnetic core 312a. Similarly, the second receiving winding 310b is vertically arranged (e.g., stacked) with respect to the second magnetic receiving core 312b. The second receiving winding 310b is formed on a second insulating layer 322b (see FIG. 3B), and an air gap can separate the second receiving winding 310b from the second receiving magnetic core 312b.

The transmitting magnetic cores 308a and 308b, and the receiving magnetic cores 312a and 312b can be formed from various magnetic materials such as, for example, a nickel-zinc ferrite material, a manganese-zinc ferrite material, or an alternate material appropriate for a given application. The windings 306a and 306b and 310a and 310b can each be composed of an electrically conductive material. In at least one embodiment, the transmitting windings 306a and 306b and the receiving windings 310a and 310b have a spiral shape, and are formed as an electrically conductive trace directly on a respective insulating layer 320a, 320b, 322a, and 322b, respectively.

Figure 4:
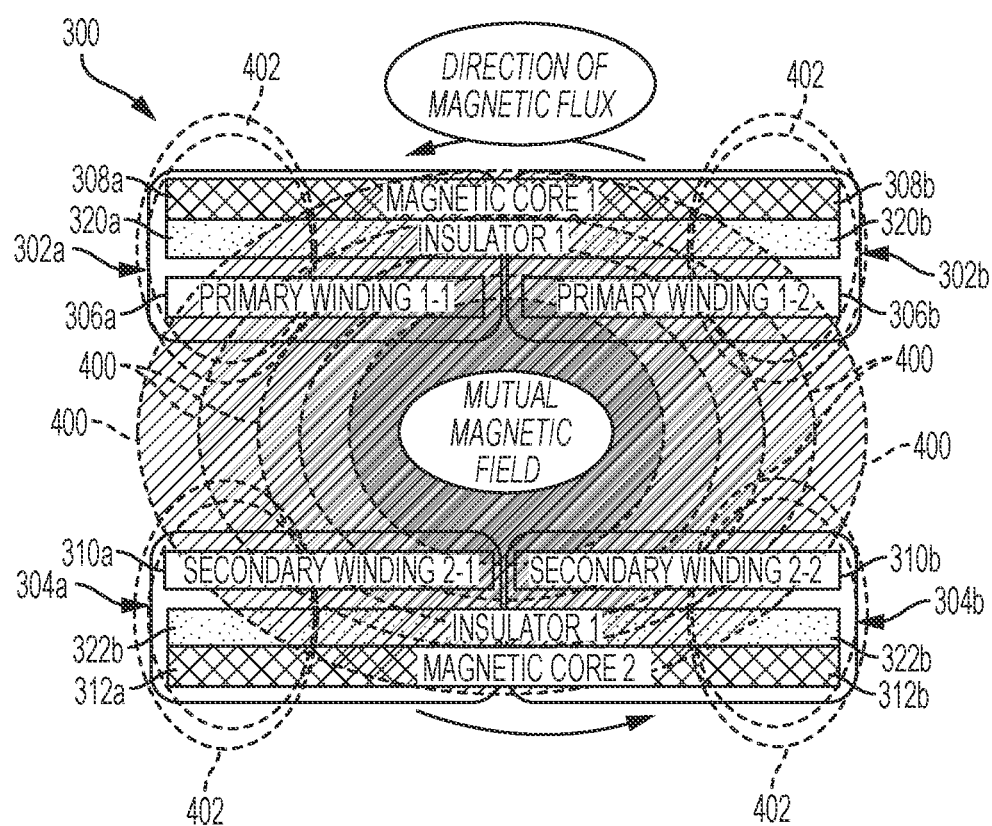
FIG. 4 illustrates the increased magnetic coupling and reduced stray magnetic fields resulting from a multi-cell, single-coil inductive wireless power transfer system according to a non-limiting embodiment.

The implementation of multiple cells (N), i.e., multiple transmitting elements 302a and 302b and multiple receiving elements 304a and 304b, allows for overlapping of magnetic field 400, thereby reducing the power fluctuation between the transmitting elements 302a and 302b and the receiving elements 304a and 304b (see FIG. 4). In addition, the amount of stray magnetic fields 402 is reduced, thereby improving the energy transmission efficiency of the multi-cell inductive wireless power transfer system 300.

Figure 5A:
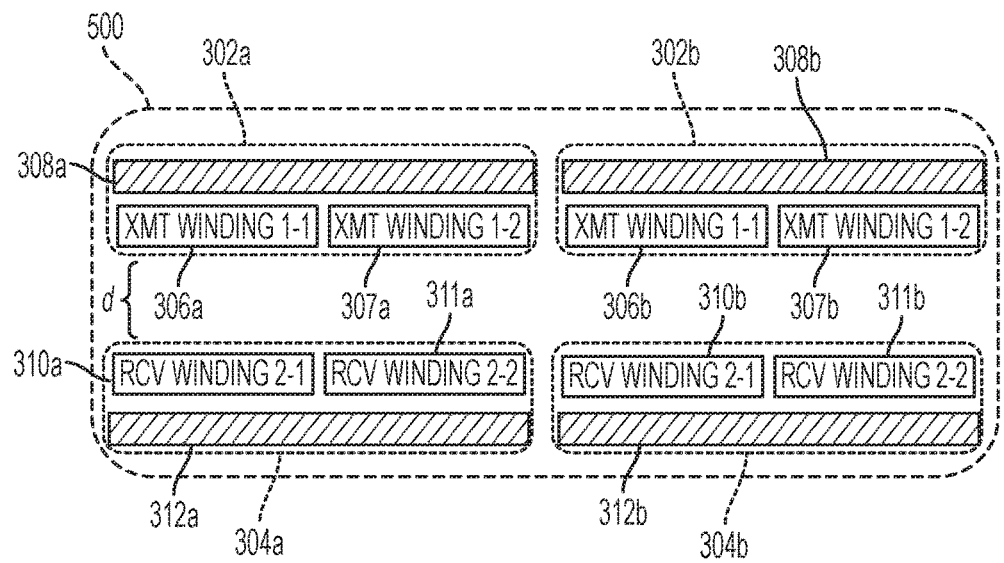
FIGS. 5A and 5B illustrate a multi-cell, dual-coil inductive wireless power transfer system according to a non-limiting embodiment.
Figure 5B:
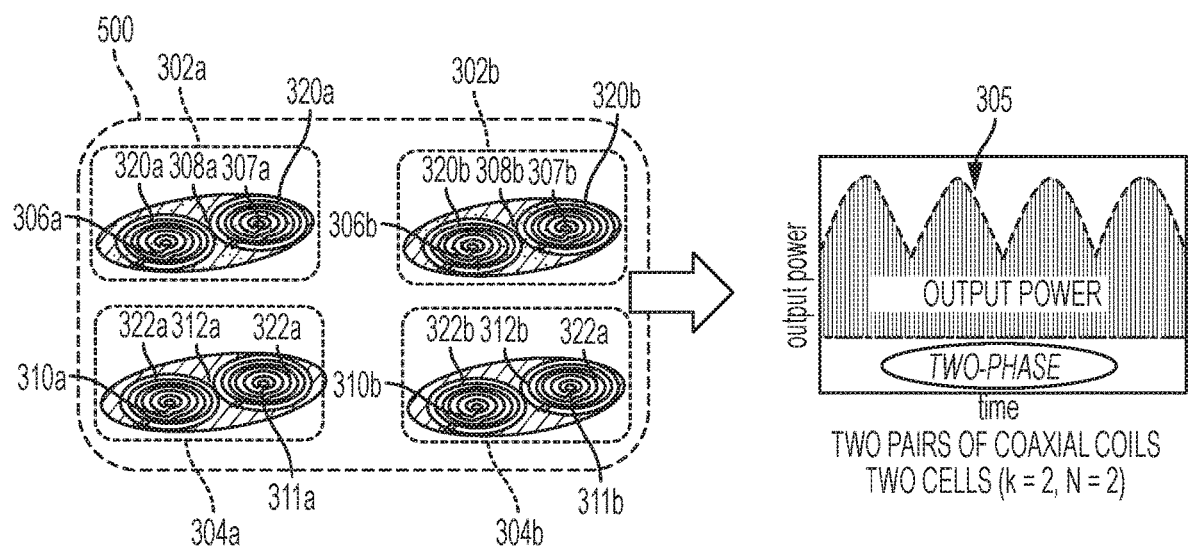

Although the multi-cell inductive wireless power transfer system 300 described above is illustrated having a single winding 306a, 306b, 310a, 310b in each individual element 302a, 302b, 304a, 304b, respectively, the invention is not limited thereto. Turning to FIGS. 5A and 5B, for example, a multi-cell, dual-coil inductive wireless power transfer system 500 according to a non-limiting embodiment. A first transmitting element 302a includes a plurality of transmitting windings 306a and 307a, and one or more transmitting magnetic cores 308a. A second transmitting element 302b also includes a plurality of transmitting windings 306b and 307b, and one or more transmitting magnetic cores 308b. The secondary elements 304a and 304b are structured in a similar manner. For instance, a first receiving element 304a includes a plurality of receiving windings 310a and 311a, and one or more transmitting magnetic cores 312a. A second receiving element 304b also includes a plurality of receiving windings 310b and 311b, and one or more transmitting magnetic cores 312b. Although the transmitting elements 302a and 302b, and the receiving elements 304a and 304b are illustrated as including two windings, the elements 302a, 302b, 304a and 304b can contain additional windings (3, 5, 7, etc.). Each of the transmitting elements 302a and 302b, and the receiving elements 304a and 304b can also include multiple magnetic cores 308a, 308b, 312a and 312b.

Although not illustrated, a given transmitting winding 306a-306b and 307a-307b can be vertically arranged with respect to an individual transmitting magnetic core. Accordingly, the number of transmitting magnetic cores included in a given transmitting element 302a and 302b matches the number of transmitting windings included in the given transmitting element 302a and 302b. Similarly, a given receiving winding 310a-310b and 311a-311b can be vertically arranged with respect to an individual receiving magnetic core. Accordingly, the number of receiving magnetic cores included in a given receiving element 304a and 304b matches the number of receiving windings included in the given receiving element 304a and 304b.

Figure 6:
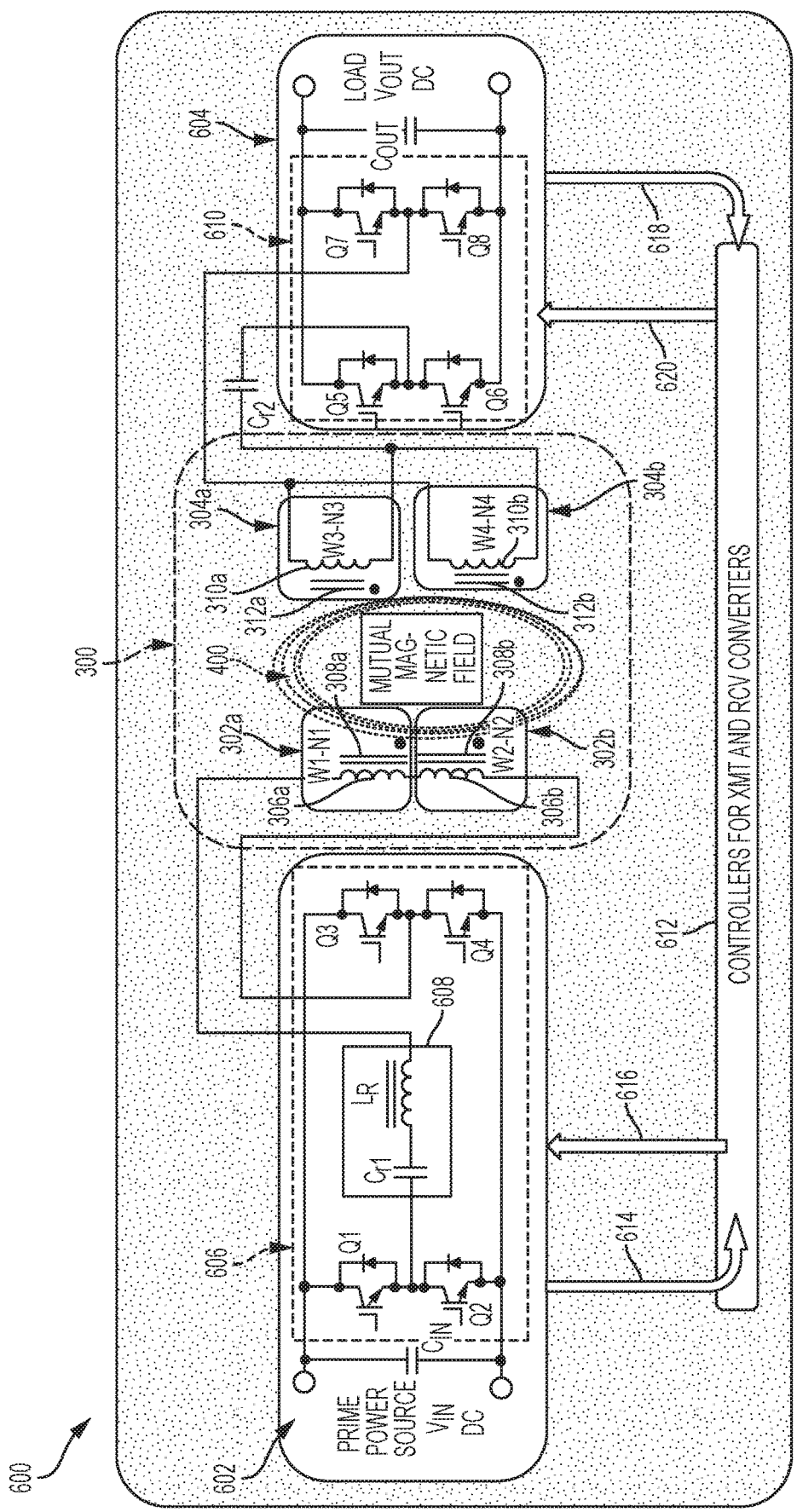
FIG. 6 illustrates a power converter configured to drive a multi-cell inductive wireless power transfer system according to a non-limiting embodiment.

Turning now to FIG. 6, a power converter system 600 configured to operate with a multi-cell inductive wireless power transfer system 300 is illustrated according to a non-limiting embodiment. The multi-cell inductive wireless power transfer system 300 includes a plurality of transmitting elements 302a and 302b, and a plurality of receiving elements 304a and 304b. Each transmitting element 302a and 302b includes at least one transmitting winding 306a and 306b, and at least one transmitting magnetic core 308a and 308b. Similarly, each receiving element 304a and 304b includes at least one receiving winding 310a and 310b, and at least one receiving magnetic core 312a and 312b. In one or more embodiments, the transmitting elements 302a and 302b are connected in series with one another, while the receiving elements 304a and 304b are connected in a parallel with one another. It should be appreciated, however, that the transmitting elements 302a and 302b and the receiving elements 304a and 304b can be connected in other configurations without departing from the scope of the invention.

The power converter system 600 further includes a transmitting power converting circuit 602 and a receiving power converter circuit 604. The transmitting power converting circuit 602 is configured to convert an input DC power signal (VIN) into a transmitting AC power signal that drives the plurality of transmitting elements 302a and 302b to generate a magnetic field 400. The energy of the magnetic field 400 is transferred across an air gap to the receiving elements 304a and 304b, where it is utilized to generate a power signal.

Still referring to FIG. 6, the transmitting power converting circuit 602 is constructed as a direct current-to-alternating current (DC-AC) converter having an input connected to a DC prime power source to receive the input power signal (VIN), and an output connected to the transmitting elements 302a and 302b. In at least one embodiment, the transmitting power converting circuit 602 includes a plurality of switches Q1, Q2, Q3 and Q4 connected in a bridge configuration to form a first bridge 606 of a bi-directional dual active bridge (DAB) circuit. The switches Q1, Q2, Q3 and Q4 can be implemented using a variety switching devices including, but not limited to, bipolar transistors, Insulated Gate Bipolar transistors (IGBTs), diodes, relays, and P-type or N-type Metal Oxide Semiconductor Field Effect Transistors (MOSFETs). In one or more embodiments, the bi-directional DAB circuit 606 also includes a resonant circuit 608 including a capacitor ($C_{R1}$) connected in series with an inductor ($L_R$). The resonant circuit 608 can be connected between a pair of switches (e.g., Q1 and Q2) among the plurality of switches (Q1-Q4) and a transmitting element (e.g., 306a) among the plurality of transmitting elements (e.g., 306a and 306b).

The receiving power converting circuit 604 is configured to convert the transferred power signal generated by the plurality of receiving elements 304a and 304b into an output DC power signal ($V_{OUT}$) to drive an electrical load. The receiving power converting circuit 604 is constructed as an AC-DC converter having an input connected to the receiving elements 304a and 304b to receive the transferred power signal, and an output configured to deliver the DC output power signal ($V_{OUT}$) to the load. In at least one embodiment, the receiving power converting circuit 604 includes a second plurality of switches Q5, Q6, Q7 and Q8 connected in a bridge configuration to form a second bridge 610 of the bi-directional DAB circuit. The second plurality of switches Q5, Q6, Q7 and Q8 can be implemented using a variety switching devices including, but not limited to, bipolar transistors, Insulated Gate Bipolar transistors (IGBTs), diodes, relays, and P-type or N-type Metal Oxide Semiconductor Field Effect Transistors (MOSFETs). In at least one embodiment, the second DAB circuit 610 includes a capacitor ($C_{R2}$) connected between the receiving elements 304a and 304b, and a pair of switches (e.g. Q5 and Q6) among the second plurality of switches (Q5-Q8).

In one or more embodiments, the power converter system 600 further includes one or more electronic hardware controllers 612 configured to control the transmitting power converting circuit 602 and the receiving power converter circuit 604. In at least one embodiment, the controller 612 can drive individual elements 302a-302b and 304a-304b by a phase-shifted signals. The phase shift angle of the signals can be defined as $\varphi=2\pi N$, where "N" is the number of transmitting elements 302n and/or receiving elements 304n controlled by the controller 612. The controller 612 can also actively adjust the phases for the transmitting elements 302a and 302b and/or the receiving elements 304a and 304b so that so that the transmitting power converting circuit 602 and the receiving power converter circuit 604 each operate with the same phase for the clock switching frequency used to drive the switches Q1-Q4 and Q5-Q8.

The controller 612 can also obtain feedback information regarding the transmitting power converting circuit 602 via a feedback transmitting data link 614. The feedback information can include, but is not limited to, the switching frequency of the switches Q1-Q4, the input power (VIN), the output current generated by the transmitting power converting circuit 602, and the converted power signal delivered to the transmitting elements 302a and 302b. Based on the feedback data 614, the controller 612 can generate one or more control signals 616 for driving one or more of the switches Q1-Q4. In at least one embodiment, the control signals 616 can be a phase-shift modulation signal that actively adjusts the switching time of the switches Q1-Q4.

Similarly, the controller 612 can obtain feedback information regarding the receiving power converting circuit 604 via a feedback receiving data link 618. The feedback information can include, but is not limited to, the switching frequency of the switches Q5-Q8, the output power ($V_{OUT}$), the output current generated by the receiving power converting circuit 604, and the transferred power signal generated by the receiving elements 304a and 304b. Based on the feedback data 618, the controller 612 can generate one or more control signals 620 for driving one or more of the switches Q5-Q8. In at least one embodiment, the control signals 620 can be a phase-shift modulation signal that actively adjusts the switching time of the switches Q5-Q8.

Figure 7B:
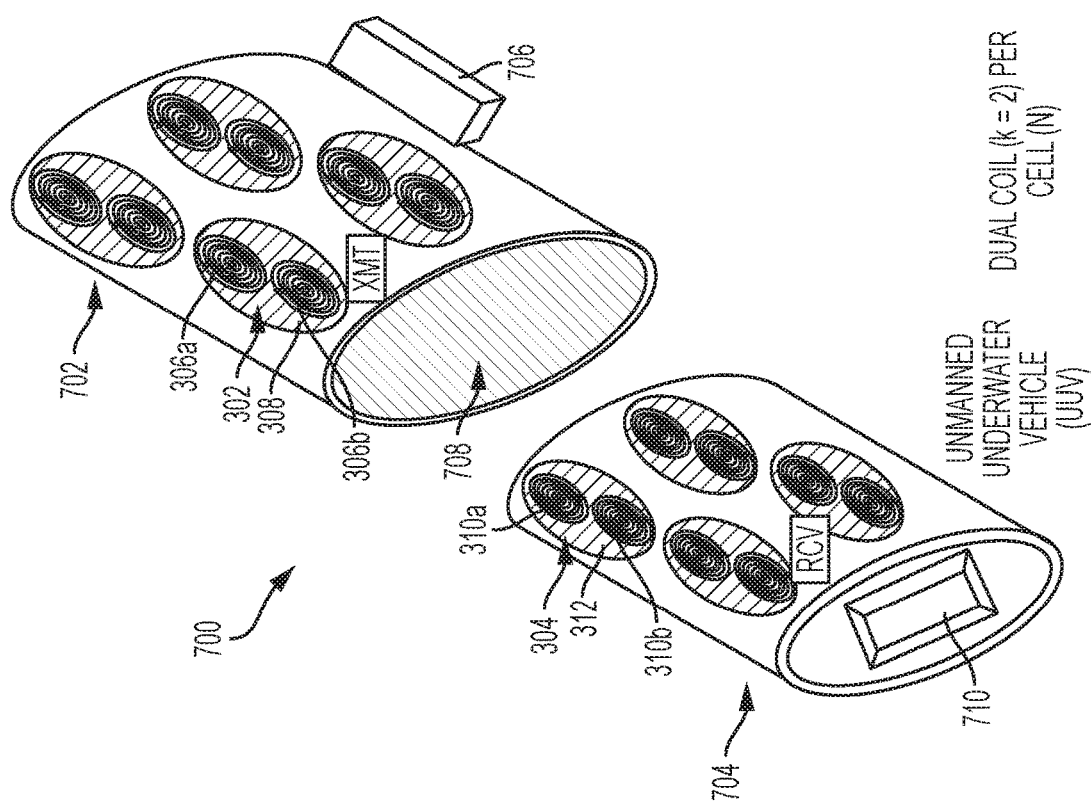
FIG. 7B illustrates the autonomous unmanned vehicle (UV) of FIG. 7A being docked with the UV charging system according to a non-limiting embodiment.
Figure 7A:
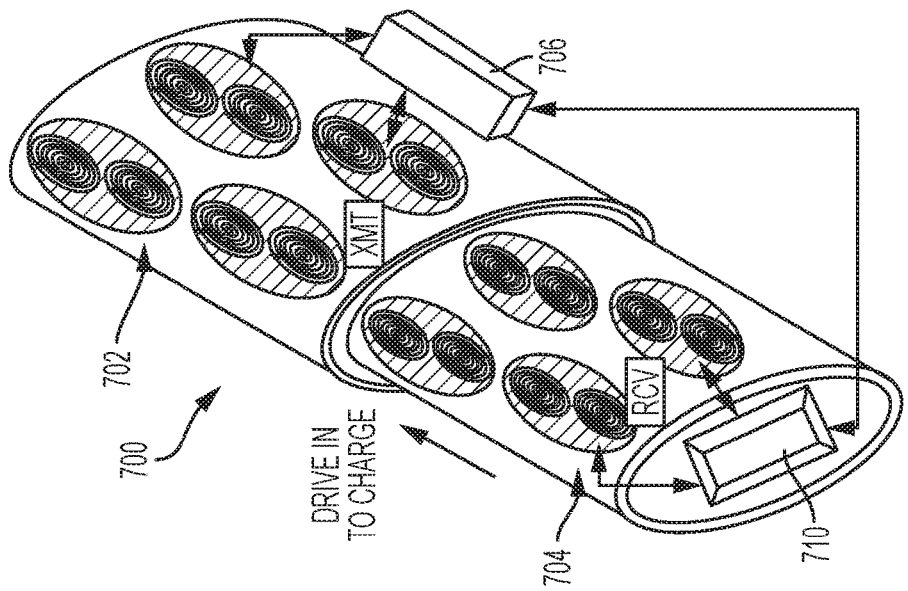
FIG. 7A illustrates an autonomous unmanned vehicle (UV) including a multi-cell dual-coil inductive wireless receiving system and a UV charging system including a multi-cell dual-coil inductive wireless transmitting system according to a non-limiting embodiment.

Turning now to FIGS. 7A and 7B, a power charging system 700 implementing a multi-cell inductive wireless power transfer system is illustrated according to a non-limiting embodiment. The power charging system 700 includes a charging station 702 configured to transfer energy to a vehicle 704. In this manner, a vehicle 704, which moves independently and separately from the charging station 702, can be charged to maintain operational power. The vehicle 704 can include a manned vehicle, or unmanned vehicle (UV). The UV can include, but is not limited to, unmanned aerial vehicles (UAVs), unmanned underwater vehicles (UUVs), or other types of UVs or drones. In any configuration, the vehicle includes a rechargeable battery (e.g., an electrical load) that is charged (i.e., energized) in response to receiving an output power generated by the power charging system 700.

The charging station 702 includes a plurality of transmitting elements 302 and an electronic hardware transmitting controller 706. Each transmitting element 302 includes one or more transmitting windings 306a and 306b, and one or more transmitting magnetic cores 308. Although not illustrated, the charging station 702 can include a power converter system or a portion of the power converter system, e.g., the transmitting power converting circuit, as described herein (see FIG. 6). Accordingly, the transmitting controller 706 can set the phase of the clock switching frequency used to drive the switches Q1-Q4 of the transmitting power converting circuit installed in the charging station 702. Accordingly, the charging station 702 can generate a magnetic field in response to energizing one or more transmitting windings arranged adjacent to at least one transmitting magnetic core included in a transmitting element (e.g., included in the transmitting power converting circuit.

The charging station 702 further includes a dock 708 configured to receive the vehicle 704. In at least one embodiment, the dock 708 is constructed as a cavity 708 sized to receive the vehicle 704 therein. In this manner, the vehicle 708 can be maneuvered to move into the cavity, thereby being docked (e.g., mechanically coupled) to the charging station 702 (see FIG. 7B). Once docked, the vehicle 704 can be recharged in response to receiving power that is wirelessly transferred from the charging station 702. Although the dock 708 is described as a cavity formed in the charging station 702, it should be appreciated that other designs capable of mechanically coupling the vehicle 704 in close proximity to the charging station 702 so as to facilitate wireless power transfer without departing from the scope of the invention.

The vehicle 704 includes a plurality of receiving elements 304 and a receiving controller 710. Each receiving element 304 includes one or more receiving windings 310a and 310b, and one or more magnetic cores 312. Although not illustrated, the vehicle 704 can include a power converter system or a portion thereof, e.g., the receiving power converter circuit, as described herein (see FIG. 6). The receiving power converter circuit can be electrically connected to the rechargeable battery installed on the vehicle 704. Accordingly, the receiving controller 710 can set the phase of the clock switching frequency used to drive the switches Q5-Q8 of the receiving power converter circuit installed in the vehicle 704. The output power generated by the receiving power converter circuit is then delivered to battery such that the battery is recharged.

Figure 8:
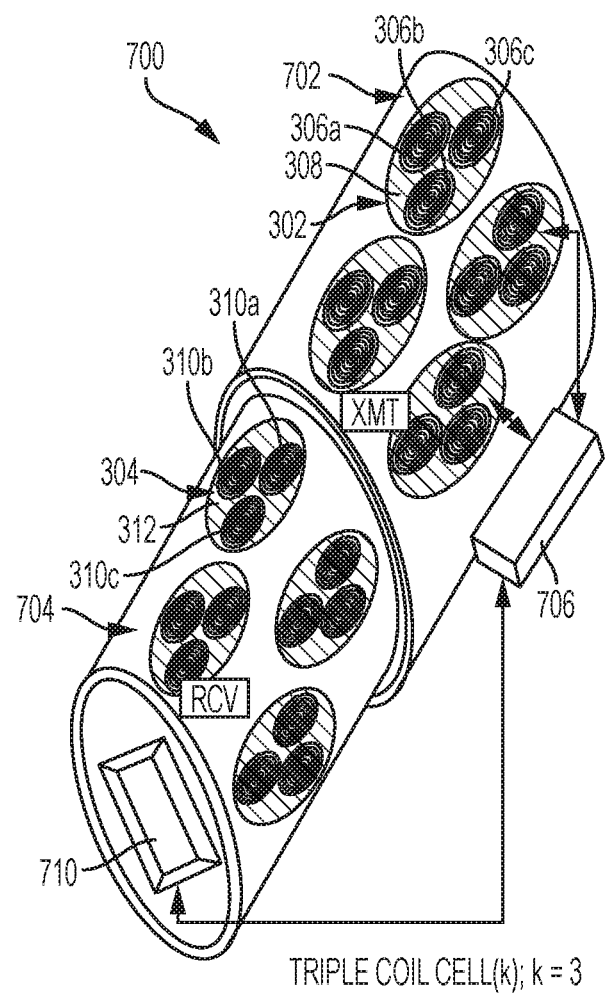
FIG. 8 illustrates an autonomous unmanned vehicle (UV) including a multi-cell triple-coil inductive wireless receiving system and a UV charging system including a multi-cell triple-coil inductive wireless transmitting system according to a non-limiting embodiment.

Although the transmitting elements 302 and receiving elements 304 are illustrated as including two windings 306a-306b and 310a-310b, respectively, it should be appreciated the more windings can be included in each element 302 and 304. Turning to FIG. 8, for example, the transmitting elements 302 and receiving elements 304 can each include three windings 306a-306c and 310a-310c, respectively. The additional windings can provide redundancy and improve fault-tolerance of the overall system 700.

In a preferable scenario, the vehicle 704 will dock with the charging station 702 such that the receiving elements 304 are aligned with the transmitting elements 302, and the phase of the receiving elements 304 (i.e., the receiving coils 310) match the phase of the transmitting elements 302 (i.e. transmitting coils 306). In some scenarios when mechanical alignment doesn't match electrical signals, however, one or more receiving elements 304 assigned a given receiving phase ($RCV_N$) may be aligned with a respective transmitting element 302 assigned a given transmitting phase ($XMT_{N-L}$). As shown in FIG. 9A, a first transmitting element 302a is set to a first phase (e.g., phase 1), while a close-proximity first receiving element 304a is initially set to a different phase (e.g., phase 5). Similarly, a second transmitting element 302b is set to a second phase (e.g., phase 5), while a close-proximity second receiving element 304b is initially set to a different phase (e.g., phase 1).

Figure 9B:
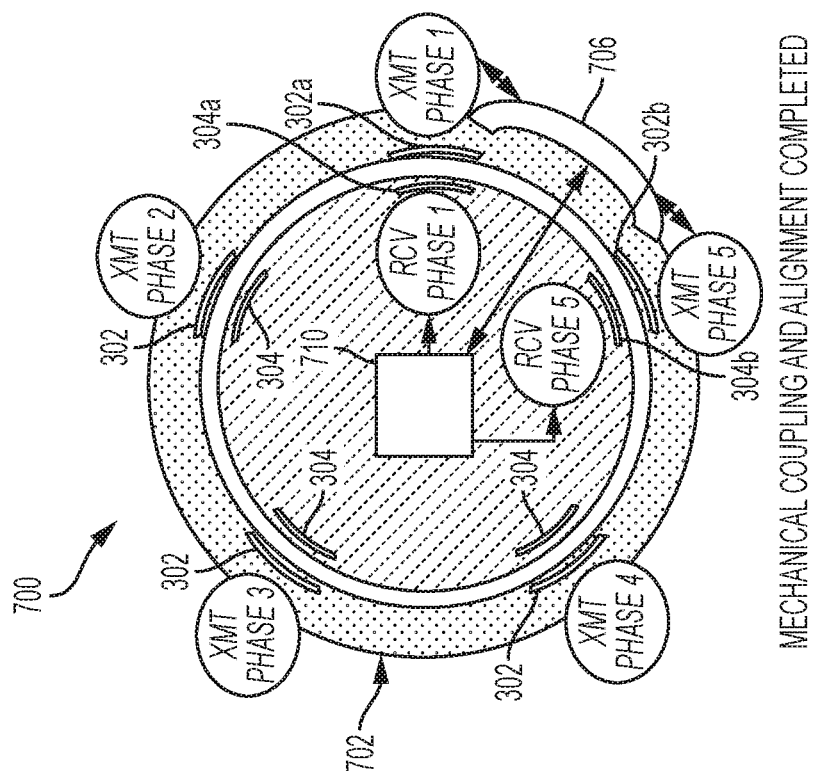
FIG. 9B illustrates the autonomous unmanned vehicle (UV) including multiple cells having receiving coils with phases that are actively reconfigured to be synchronized with respect to the transmitting coils of the UV charging system.
Figure 9A:
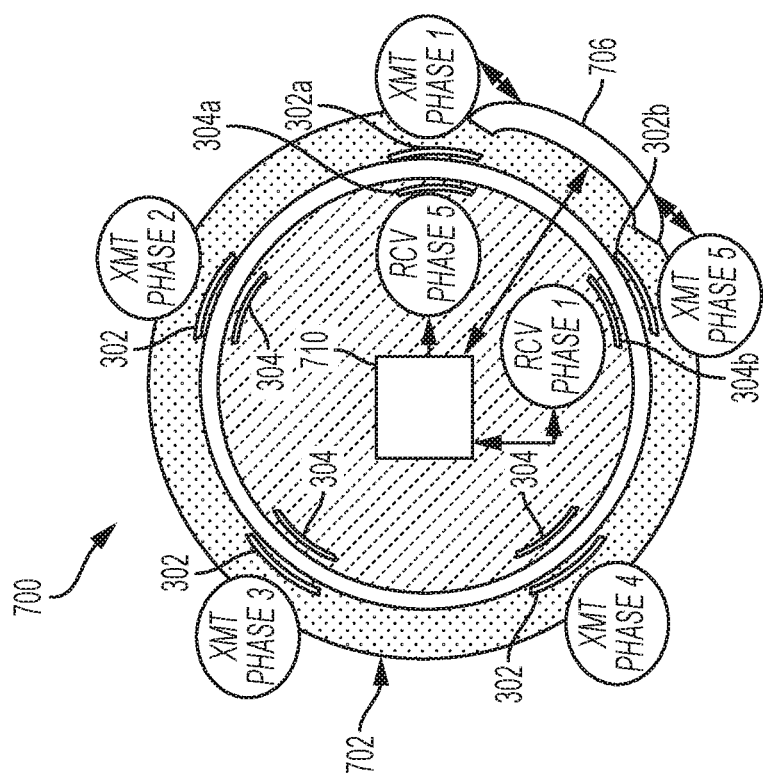
FIG. 9A illustrates an autonomous unmanned vehicle (UV) including multiple cells having receiving coils with phases that are misaligned with respect to transmitting coils of a UV charging system.

Turning to FIG. 9B, the transmitting controller 706 and the receiving controller 710 can communicate with each other to determine the phases of each receiving element 304, and determine whether the phase ($RCV_N$) of a given receiving element 304n matches the phase ($XMT_N$) of a given transmitting element 302n. When the phase of one or more receiving elements (e.g., 304a and 304b) does not match the phase of its respective transmitting element (e.g., 302a and 302b), the transmitting controller 706 and/or the receiving controller 710 can adjust the phase of the cells. In this manner, the phase of the elements 302 and/or 304 can be actively adjusted so that they are brought into phase (i.e., matching phase) with one another as shown in FIG. 9B. For example, receiving element 304a can be reconfigured from phase 5 to phase 1, which matches the phase of transmitting element 302a. Similarly, receiving element 304b can be reconfigured from phase 1 to phase 5, which matches the phase of transmitting element 302b. Accordingly, the output power quality and charging efficiency can be optimized or improved compared to a system where the phases of the transmitting elements and receiving elements are mismatched.

Figure 10A:
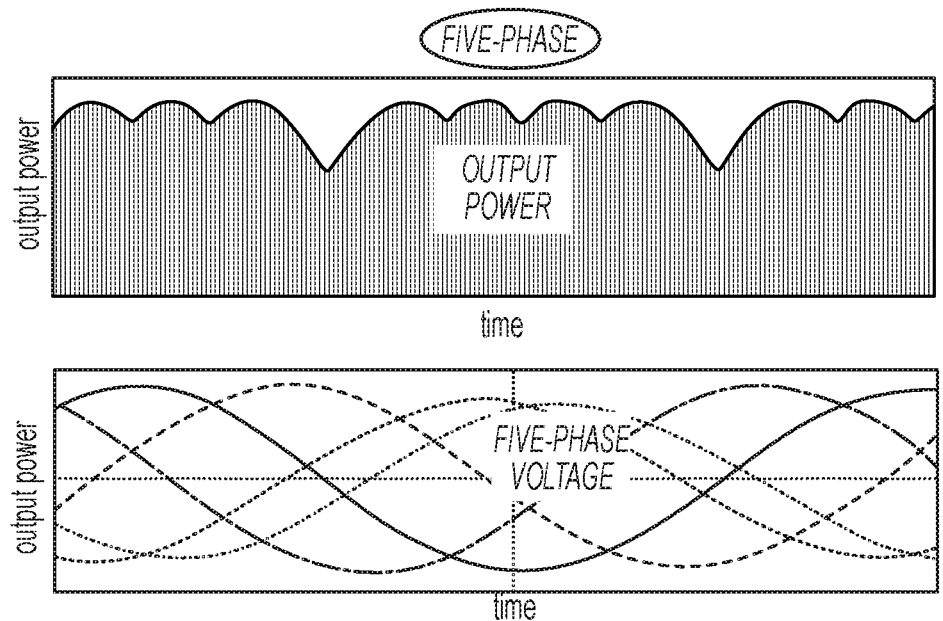
FIG. 10A is a signal diagram illustrating the output power following loss of a phase signal included in a multi-cell inductive wireless power transfer system.

The transmitting controller 706 and the receiving controller 710 can also communicate with each other to determine whether the charging system 700 loses a phase (e.g., a coil fails). FIG. 10A, for example, illustrates the output power generated by a multi-cell inductive wireless power transfer system following loss of one phase (e.g., a failed coil) included in a five-phase system. The loss of a phase results creates an unbalanced phase of the total output power signal, which causes in an increased lower frequency ripple, increases stress in the components, and reduces power transfer efficiency. The increases ripple may also prevent the system from meeting power quality requirements and ratings.

Figure 10B:
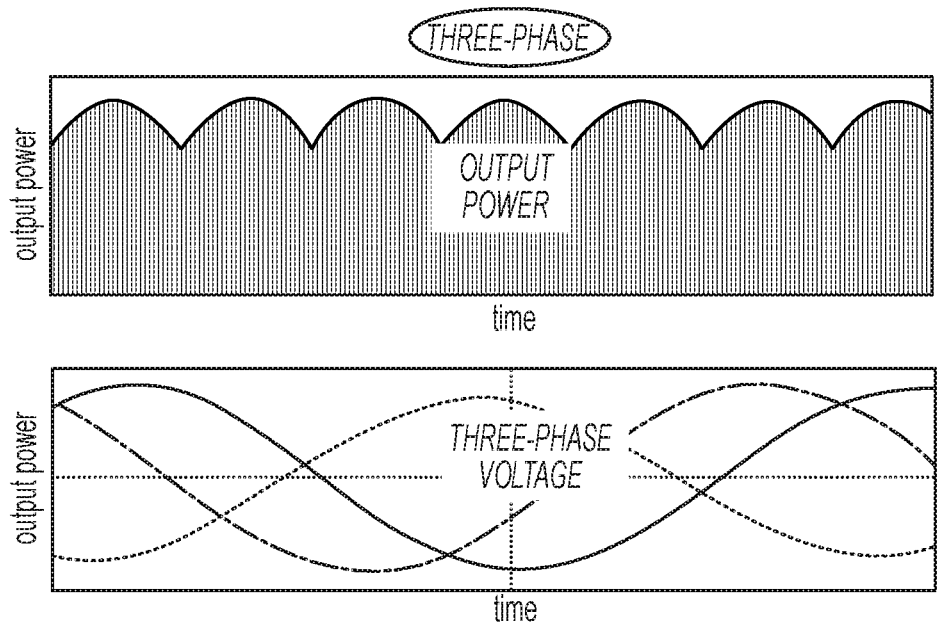
FIG. 10B is a signal diagram illustrating the output power after restoring balance of the phase signal in the multi-cell inductive wireless power transfer system.

When a phase is determined to be lost (e.g., a coil fails), the transmitting controller 706 and the receiving controller 710 can identify the lost phase (i.e., failed coil), and reassign remaining phases to a new synchronization frequency to restore the phase balance of the total output power signal. In this manner, phase balance is restored with a lower phase, which reduces the previous ripple as shown in FIG. 10B. The transmitting controller 706 and the receiving controller 710 can also activate redundant cell or coil, which replaces the identified failed cell or coil.

As described herein, various non-limiting embodiments provides a multi-cell inductive wireless power transfer system capable of reducing power fluctuation between the transmitting elements and the receiving elements, while reducing the amount of stray magnetic fields. The multi-cell inductive wireless power transfer system can be implemented with a power converter system, capable of actively adjusting the phase and switching frequency of the switches used to drive the transmitting and/or receiving elements. In this manner, an inductive wireless power transfer system having improved energy transfer efficiency is provided compared to single-cell power transfer systems.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. A power converter system comprising:
    a multi-cell inductive wireless power transfer system, wherein each cell included in the multi-cell inductive wireless power transfer system comprises a plurality of transmitting elements and a plurality of receiving elements, wherein each transmitting element includes at least one transmitting winding and at least one transmitting magnetic core, and each receiving element includes at least one receiving winding and at least one receiving magnetic core;
    a transmitting power converting circuit configured to convert an input power signal into a transmitting power signal to drive the plurality of transmitting elements;
    a receiving power converting circuit configured to convert a transferred power signal received at the plurality of receiving elements into an output power signal to drive an electrical load; and
    a controller in signal communication with the transmitting power converting circuit and the receiving power converting circuit, the controller configured to actively adjust one or both of transmitting phase angles of the transmitting elements and receiving phase angles of the receiving elements,
    wherein the controller actively adjusts one or both of the transmitting phase angles of the transmitting elements and the receiving phase angles of the receiving elements so that the transmitting phase angles match the receiving phase angles.

2. The power converter system of claim 1, wherein in each transmitting element among the plurality of transmitting elements are separated from one another such that each transmitting winding included with a respective transmitting element is separated from one another, wherein in each receiving element among the plurality of receiving elements are separated from one another such that the each receiving winding included with a respective transmitting element is separated from one another, and wherein the plurality of transmitting elements are separated from the receiving elements by an air gap.

3. The power converter system of claim 2, wherein the transmitting power converting circuit is a direct current-to-alternating current (DC-AC) converter having an input connected to a prime power source to receive the input power signal, and an output connected to the plurality of transmitting elements.

4. The power converter system of claim 3, wherein the DC-AC converter includes a plurality of switches connected in a bridge configuration to form a first bridge comprising a bi-directional dual active bridge (DAB) circuit.

5. The power converter system of claim 3, wherein the receiving power converting circuit is an AC-DC converter having an input connected to the plurality of receiving elements to receive the transferred power signal, and an output configured to deliver the output power signal.

6. The power converter system of claim 5, wherein the AC-DC converter includes a second plurality of switches connected in a bridge configuration to form a second bridge of the bi-directional dual active bridge (DAB) circuit.

7. The power converter system of claim 6, wherein the first bridge of the bi-directional dual active bridge (DAB) circuit includes a filter circuit connected between a pair of switches among the first plurality of switches and a transmitting element among the plurality of transmitting elements.

8. The power converter system of claim 7, wherein the second bridge of the bi-directional dual active bridge (DAB) circuit includes a capacitor connected between a pair of switches among the second plurality of switches and a receiving element among the plurality of receiving elements.

9. The power converter system of claim 6, wherein the plurality of transmitting elements are connected in series with one another, and the plurality of receiving elements are connected in parallel with one another.

10. The power converter system of claim 1, wherein a first transmitting winding of a first cell is formed on a first insulating layer, and second transmitting winding is formed on a second insulating layer different from the first insulating layer.

11. The power converter system of claim 10, wherein the first winding and the second winding are separated from one another.

12. The power converter system of claim 1, wherein the transmitting power converting circuit includes a first plurality of switches and the receiving power converting circuit includes a second plurality of switches, and
    wherein the controller actively controls one or both of a first switching frequency of the first plurality of switches and a second switching frequency of the second plurality of switches such that the first switching frequency matches the second switching frequency so that the transmitting phase angles of the transmitting elements match the receiving phase angles of the receiving elements.

* * * * *